United States Patent [19]

Penrose et al.

[11] Patent Number: 5,662,511
[45] Date of Patent: Sep. 2, 1997

[54] HONEY FRAME FEEDING APPARATUS

[75] Inventors: David F. Penrose, Christchurch; Roland A. Hitchcox; Neil M. Hitchcox, both of Timaru, all of New Zealand

[73] Assignee: David Frederick Penrose, Christchurch, New Zealand

[21] Appl. No.: 496,194

[22] Filed: Jun. 28, 1995

[30] Foreign Application Priority Data

Jun. 29, 1994 [NZ] New Zealand ............. 260872

[51] Int. Cl.⁶ ............................................. A01K 51/00
[52] U.S. Cl. ............................................. 449/50; 449/54
[58] Field of Search ............................. 449/50, 54, 56

[56] References Cited

U.S. PATENT DOCUMENTS

| | | | |
|---|---|---|---|
| 2,580,397 | 1/1952 | Bogenschutz | 449/54 |
| 3,735,433 | 5/1973 | Smith | 449/54 |
| 5,295,894 | 3/1994 | De Cleroq | 449/54 |

Primary Examiner—Robert P. Swiatek
Attorney, Agent, or Firm—Cushman, Darby & Cushman

[57] ABSTRACT

Apparatus for feeding honey frames into a Cook & Beals automatic rotary cutter uncapping machine, the apparatus providing a pair of spaced horizontal conveyors from which are suspended honey frames to be fed into a Cook & Beals machine. The horizontal conveyors are arranged to feed the frames one by one onto spaced parallel vertical conveyors which carry the frames singly into the Cook & Beals machine. The apparatus provides a picker for pulling frames one by one from the horizontal to the vertical conveyors and a stop which acts to prevent frames on the horizontal conveyors from being transferred to the vertical conveyors except at the correct position of the vertical conveyors.

12 Claims, 5 Drawing Sheets

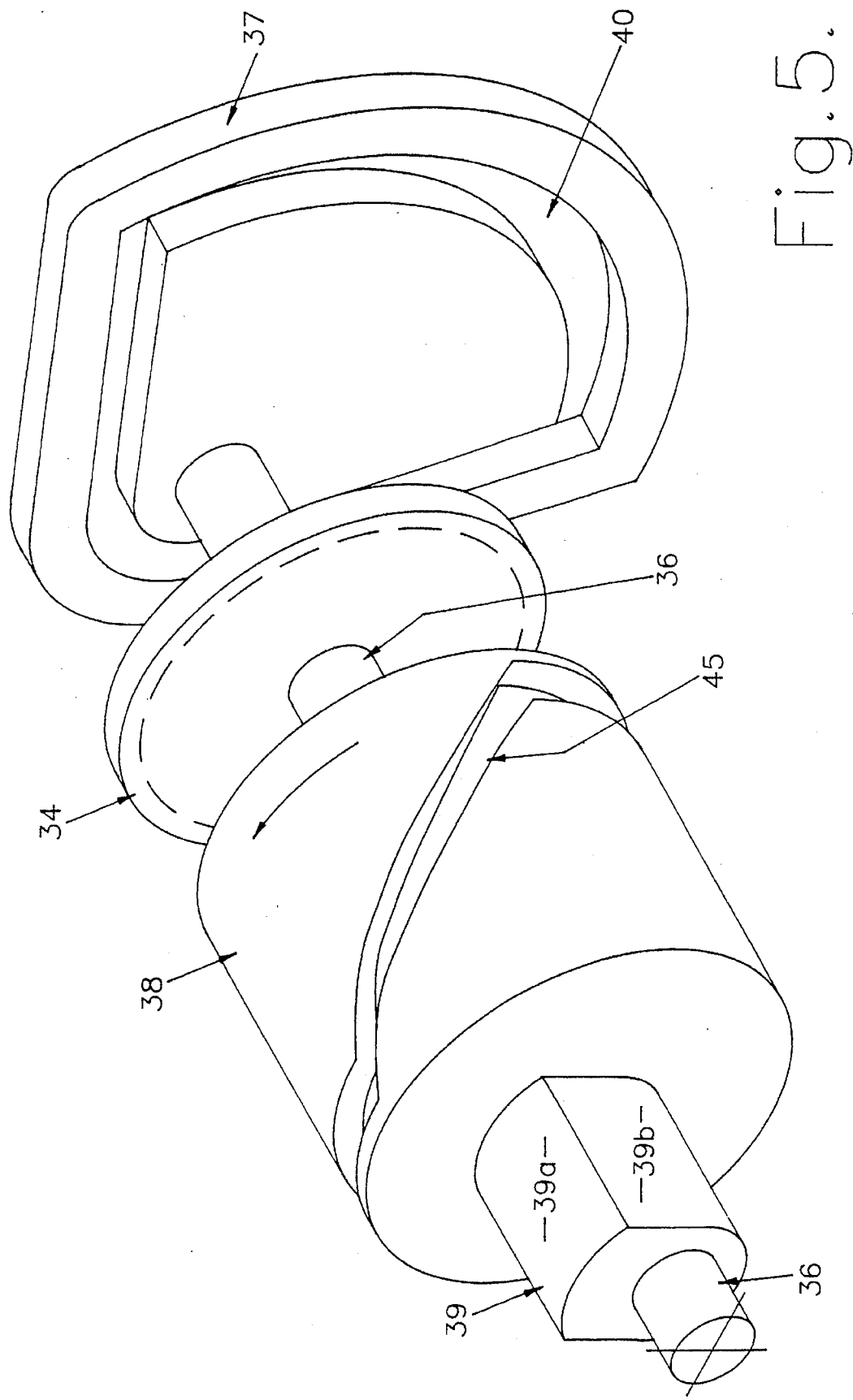

HONEY FRAME FEEDING APPARATUS

BACKGROUND OF THE INVENTION (1) Field of the Invention

The present invention relates to apparatus for feeding honey frames into a Cook & Beals Automatic Rotary Cutter Uncapping Machine (hereinafter called a 'C & B').

In all modern hives, honey frames are rectangular wooden frames formed with the outer ends of the upper edge extended outwards to form a lug at each upper corner of the frame. A sheet of wax fills in the frame, to serve as a base for the bees' construction of a honeycomb. When completed, the honeycomb covers both sides of the original starter sheet of wax, and the outer surfaces of the honeycomb bulge outwards from the plane of the frame. These outer surfaces are sealed with a capping of beeswax by the bees. Before honey can be extracted from the honeycomb, this capping has to be removed. On a small scale, this can be done by hand, but on the scale of commercial honey production, this job must be done mechanically. A number of machines are known for this purpose, but the C & B is one of the most widely used throughout Canada and the USA, and has been an industry standard in USA for about 35 years.

The C & B uses rotary cutters to cut the cappings from each side of the frame. However, the design of the C & B is such that frames must be fed vertically into the machine, one at a time, by pressing each frame downwards through a pair of flexible flaps which prevent honey from splashing upwards out of the machine.

(2) Description of the Prior Art

At present, no satisfactory automatic feed exists for a C & B:—each individual frame must be fed into the C & B manually. This is time-and-labour-intensive, and it is an object of the present invention to provide apparatus capable of automatically feeding honey frames one by one into a C & B.

BRIEF SUMMARY OF THE INVENTION

The present invention provides apparatus for feeding honey flames one by one into a C & B (as hereinbefore defined), said apparatus comprising:

a pair of continuous spaced parallel horizontal conveyors adapted to convey a plurality of honey flames from a first position at which said frames are loaded onto said conveyors to a second position at which said frames are removed one by one from said conveyors and conveyed to a C & B, each said frame being supported upon said horizontal conveyors by a lug formed at each upper corner of said frame and projecting outwards therefrom;

a pair of continuous spaced parallel vertical conveyors extending from adjacent said second position down to said C & B; said vertical conveyors being formed with opposed gaps therein each sized to receive one of said lugs therein;

a movable stop which is arranged to prevent frames on the horizontal conveyors from moving onto the vertical conveyors until said gaps are at a predetermined position, and there is sufficient room for a frame to hang vertically between said conveyors; and a reciprocating picker bar which is arranged to draw the single frame closest to said second position on the horizontal conveyors onto the vertical conveyors, when said gaps reach said predetermined position, such that said frame lugs are received within said chain gaps.

The horizontal and vertical conveyors preferably are feed chains.

Preferably, the apparatus also includes a bridge bracket adjacent each of the horizontal conveyors at the second position; the bridge brackets are arranged to support the frame closest to the second position.

Preferably, the apparatus also includes a pushing means for pushing downwards upon a frame held in the gaps in the vertical conveyors, into firm engagement with the conveyors. The pushing means preferably is secured to the stop or is formed integrally with the stop.

As used herein, the term "driving wheels" includes driving pulleys of known type and sprocket wheels. The driving wheels would be used in combination with flat or v drive belts; the sprockets would be used in combination with driving chains.

The separate moving parts of the apparatus may be individually powered by separate motors. In this case, preferably a suitable timing device of known type would be employed to ensure that the various moving parts were timed correctly one with another. It is preferred however that all the moving parts of the apparatus should be driven from a single motor, which is arranged to drive: 1) a first shaft upon which are mounted two spaced first driving wheels each drivably engaged with one of said horizontal conveyors; 2) two spaced counter-rotating second driving wheels each drivably engaged with one of said vertical conveyors; 3) a third driving wheel which is mounted upon a common axis with three cams.

The vertical conveyor chains are similar in type and position to those at present used in a C & B, but when the C & B is used in combination with the present invention, either the existing C & B vertical chains are modified to extend vertically upwards beyond the usual point at which the C & B chains end, or the C & B chains are removed and replaced by chains of the same type which extend further upwards.

BRIEF DESCRIPTION OF THE DRAWINGS

By way of example only, a preferred embodiment of the present invention is described in detail with reference to the accompanying drawings, in which:

FIG. 5 is an enlarged isometric view of the train of control cams.

DETAILED DESCRIPTION OF THE INVENTION

Figure 1:
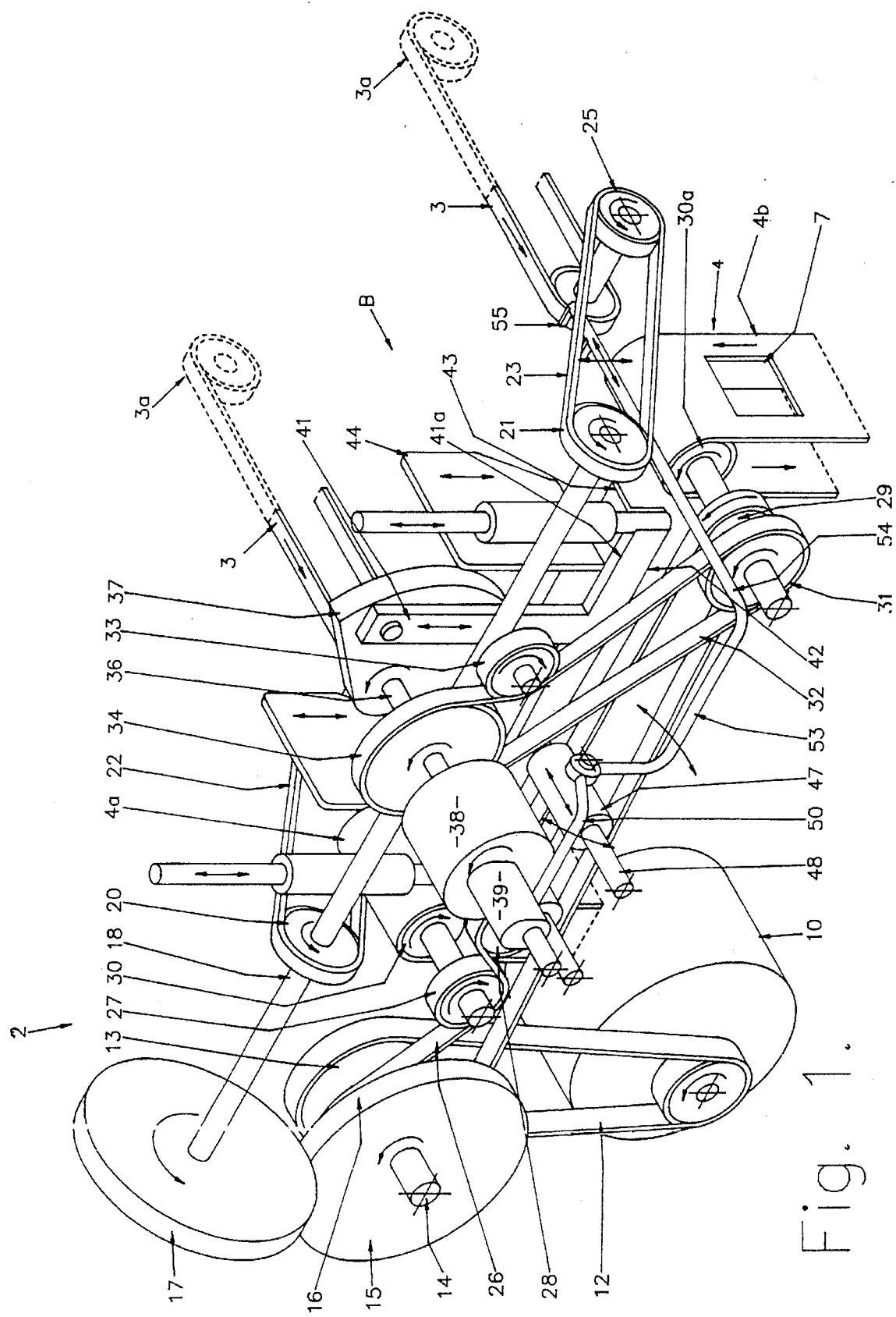
FIG. 1 is an isometric overall view of the apparatus, with some parts omitted for clarity.

Referring to FIG. 1, the feeding apparatus 2 of the present invention is shown diagrammatically. The apparatus 2 is designed to be fitted on top of a C & B, with a minimum of alteration to the C & B. To fit the machine of the present invention, the vertical feed chains of the C & B are replaced/extended (as described above) and the flexible flaps which normally are positioned at the upper ends of the vertical feed chains are relocated part-way down the length of said feed chains, and attached to the cutter guards of the C & B.

The apparatus 2 consists of a pair of spaced, parallel horizontal feed chains 3 which are arranged to feed honey frames into a pair of spaced, parallel vertical feed chains 4a, b, which draw the frames one by one into the C & B (not shown) mounted below the apparatus 2. The chains 4a, 4b are the existing C & B vertical feed chains extended further upwards, as described above.

Full honey frames arrive stacked in the boxes which form part of the hives, and the frames are removed from their boxes and placed on the outer ends 3a of the feed chains 3 either manually or (preferably) by an automatic de-boxing machine.

Figure 3:
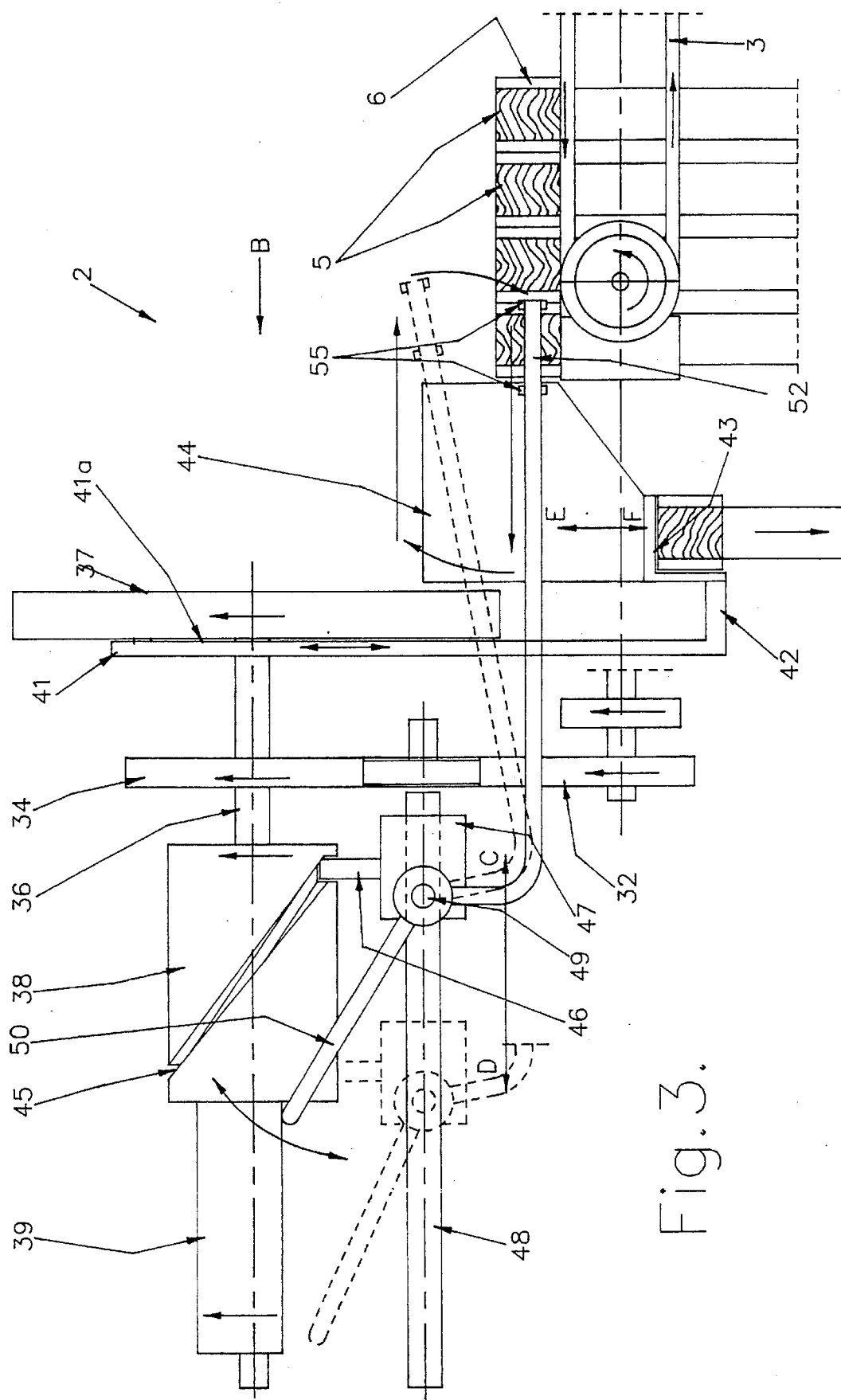
FIG. 3 is a side view of the machine in the direction of arrow A of FIG. 2, with the vertical feed chain removed and showing the bracket stop.
Figure 4:
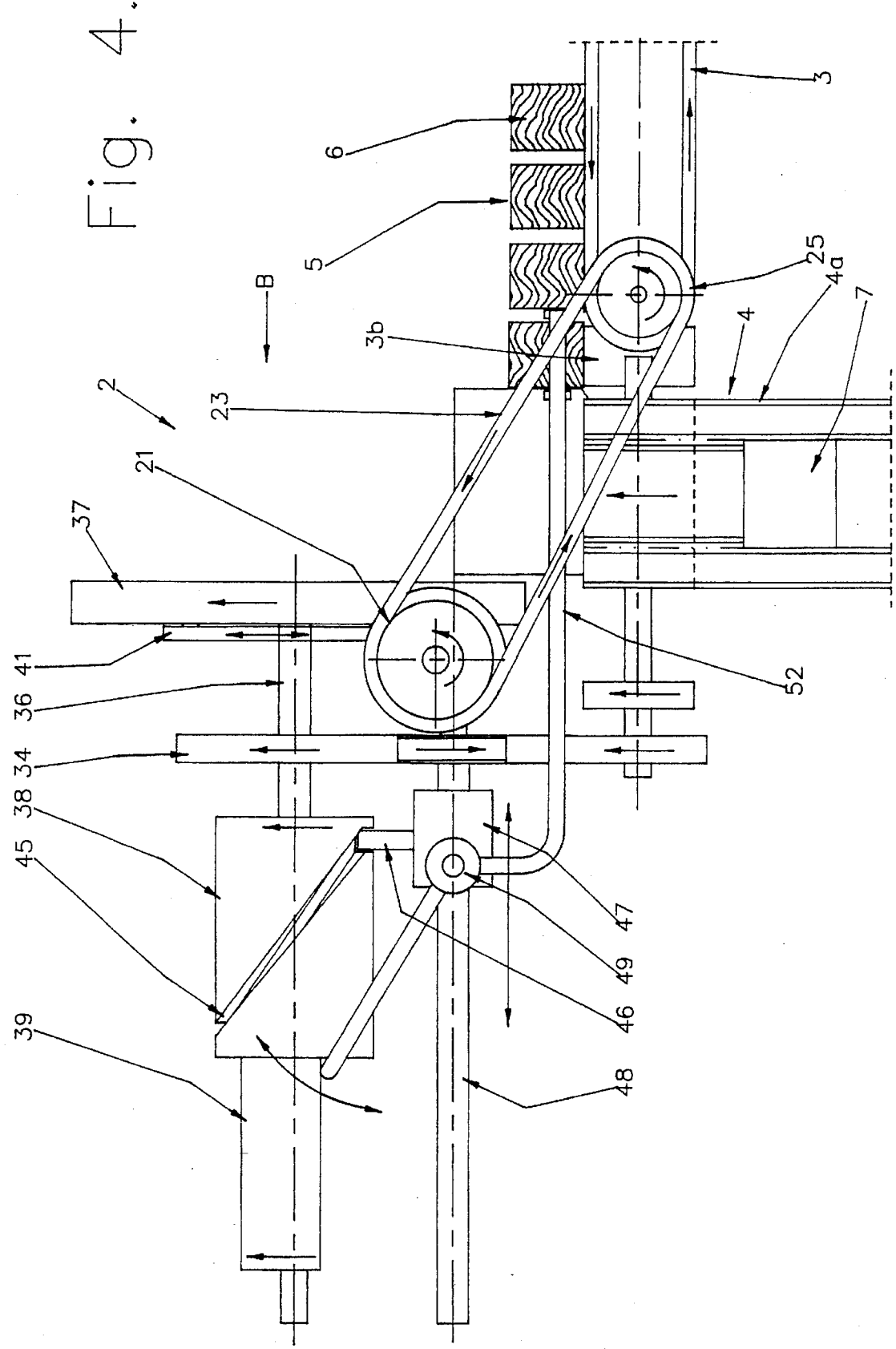
FIG. 4 is a view similar to FIG. 3 but showing the vertical feed chain in place and the bracket and stop removed.

Each frame 5 is supported from the chains 3 by the lugs 6 formed by the outer extensions of the upper edge of each frame at each upper corner (FIG. 3 and 4).

Each feed chain 3 is an endless conveyor chain which is driven by drive sprockets in known manner. The feed chains 3 feed each frame 5 in the direction of arrow B, towards the upper end of the vertical feed chains 4. A bridge bracket 3b (FIG. 4) is positioned between the inner end of each chain 3 and the top of each corresponding chain 4. The bridge brackets provide a stable flat surface upon which a frame 5 can be supported by its lugs 6, so that the frame is not swinging or unevenly supported when it is pulled onto the chains 4, as hereinafter described.

Each feed chain 4 consists of an endless conveyor chain driven by drive sprockets in known manner. The surface of each feed chain 4 is formed with gaps 7; each gap 7 is sized to accommodate a lug 6 within it, and the gaps 7 in the opposed chains 4 are arranged opposite each other. The distance between each gap 7 and the next gap 7 on that chain is equal to, or slightly greater than, the vertical height of a honey frame 5. The horizontal spacing between the feed chains 4 is slightly greater than the width of a honey frame without the lugs 6. Thus, as each frame 5 reaches the inner end of the horizontal feed chains 3, rests on the bridge brackets 3b and is transferred to the vertical feed chains 4 (as hereinafter described), the lugs 6 on each frame fit within the opposed gaps 7 to suspend the frame from the chains 4.

As each frame reaches the inner end of the horizontal feed chain 3, and rests on the bridge brackets 3b, it must be prevented from moving further towards the chains 4 until it is correctly aligned with the gaps 7, and must then be pulled forwards onto the chains 4, pushed into engagement with the gaps 7, and then carried through the flexible flaps (not shown) at the top of the C & B. These pulling and pushing motions must of course be timed to correspond with the positioning of the gaps 7 in the chains 4.

Figure 2:
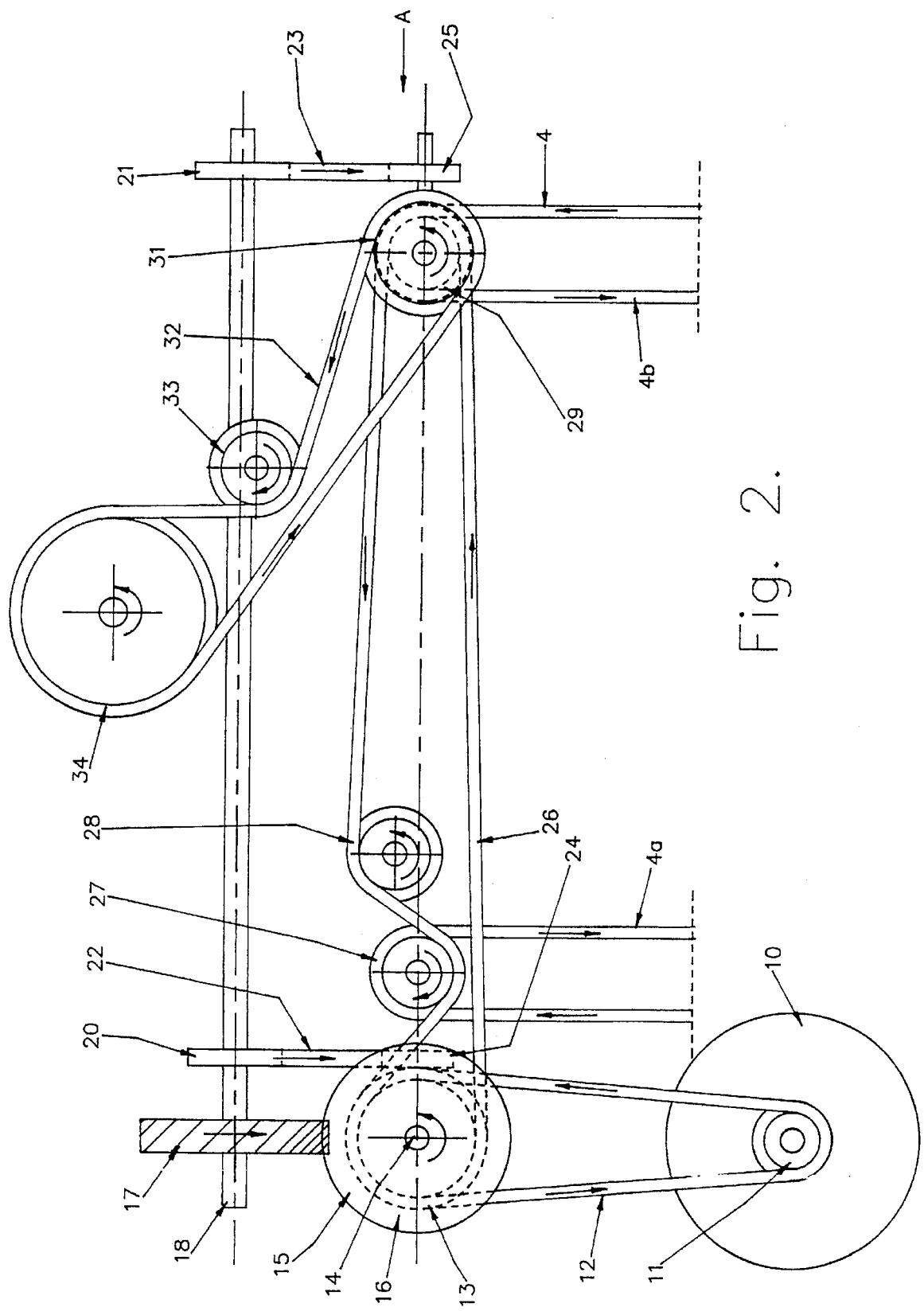
FIG. 2 is a view of the machine from the rear.

Referring in particular to FIG. 2, all moving parts are driven from an electric motor 10 through a slip clutch 11. The motor 10 drives a drive chain 12 which passes over a sprocket 13. The sprocket 13 is mounted upon a shaft 14 co-axial with a gear wheel 15 and a second sprocket 16.

The gear wheel 15 meshes with an upper gear wheel 17 which rotates a horizontal drive-shaft 18, upon which are mounted two spaced sprockets 20, 21 which power the horizontal feed chains 3 via chains 22, 23 and sprockets 24, 25. Sprockets 21, 25 and chain 23 are visible also in FIG. 4.

The sprocket 16 drives a chain 26 which engages sprockets 27, 28 and 29. The sprocket 27 lies adjacent the sprocket 16, on the same horizontal plane as said sprocket 16 and the chain 26 engages the underside of the sprocket 27, to rotate the sprocket 27 in the opposite direction to the sprocket 16. Sprocket 28 is a tensioning sprocket, and may be moved vertically upwards from the position shown in the drawings, to increase the degree of wrap of the chain 26 around the sprocket 27, and hence reduce the risk of the chain jumping off the sprocket under load.

A further sprocket 30 is co-axial with the sprocket 27, and drives one of the vertical feed chains 4a. The second vertical feed chain 4b is also driven from the chain 26, through a sprocket 30a co-axial with the sprocket 29. The chains 4a and 4b move at the same speed, but in opposite directions, since both chains are driven from chain 26 but sprocket 27 and its co-axial sprocket are reversed in direction to sprocket 29. At their lower ends (not visible) both chains 4a, 4b, pass around a further pair of sprockets.

A second sprocket co-axial with sprocket 29 is sprocket 31 which drives a chain 32. The chain 32 is engaged with sprockets 33 and 34. Sprocket 33 is a tensioning sprocket. Sprocket 34 is mounted upon an axle 36 which also carries a train of three cams:—37, 38, 39 (FIGS. 3–5).

Cam 37 is a face cam and lies with its plane vertical, equidistant from the vertical feed chains 4a, 4b. The rear face of cam 37 (see FIG. 5 only) is formed with a 'D'-shaped track 40, and a follower 41 (FIG. 3) is engaged with this track.

As the axle 36 is rotated by the sprocket 34 and the chain 32, the cams 37, 38 and 39 rotate with the axle. As the cam 37 rotates, the follower 41 travels around the track 40. The follower 41 comprises a pin which engages the track 40, the pin being secured to one face of a plate 41a the lower edge 42 of which extends below the upper ends of the vertical feed chains 4 (see FIG. 3). Said lower edge 42 forms a perpendicular ledge to the outer edge of which is secured a right-angle bracket 43 which extends across the full width of the apparatus between the vertical feed chains. A stop 44 is secured along the upper surface of the bracket 43 and extends upwards from the bracket 43.

The travel of the follower 41 is such that as the cam 37 rotates, the bracket 43 and stop 44 travel vertically between the position shown in FIG. 3, at which the bracket 43 is in its lowest position and the stop 44 extends across the front of the apparatus at the level of the lugs 6 of frames 5 supported on the horizontal feed chains 3; and a position in which the horizontal member of the bracket 43 lies above said lugs 6, so that a frame 5 can slide off the horizontal feed chains 3, across the bridge brackets 3b, past stop 44, and engage the vertical feed chains 4.

The cam 38 is a cylindrical face cam with a track 45 sunk around and along the cylindrical surface of the cam. A cam follower 46 (FIG. 3) engages the track 45 and travels along the track 45 as the cam 38 rotates about its longitudinal axis on the axis 36. Each of a pair of parallel cylinders 47 (only one of which is visible) is slidably mounted upon a shaft 48 which extends horizontally parallel to the axle 36, between support members (not shown).

The cam follower 46 is secured to a shaft 49 connected between said cylinders 47. Thus, as the cam follower 46 reciprocates in a horizontal plane, the cylinders 47 also reciprocate, sliding along the shafts 48.

A U-shaped bar 50 is pivoted on the shaft 49 at each end, and is spring-biassed (spring not shown in the drawings) to keep the cross-piece of the U in contact with the surface of the cam 39, which is a linear lift cam. A picker bar 52 is rigidly secured at each free end to the ends of the bar 50.

The picker bar 52 consists of two short parallel portions 53 (FIG. 1), each of which is rigidly secured at one end to the ends of the bar 50 and extends at an obtuse angle (typically about 135°) to said ends. The other ends of the portions 53 are integrally formed with side portions 54 which extend at 90° to said portions 53. The other end of each side portion 54 carries a pair of short parallel fingers 55 which are spaced apart by a distance slightly greater than the width of a lug 6.

As the follower 46 travels along the track in the cam 38 and reciprocates, the picker bar 52 also reciprocates, between the position of FIG. 3, in which the fingers 55 lie one each side of the lugs 6 of the frame 5 nearest to the ends of the chains 3, and a position in which the fingers 55 lie between the vertical feed chains 4.

As the picker bar 52 reciprocates, it also rises and falls between the position shown in broken lines in FIG. 3 and the solid-line position. The rise and fall is controlled by the cam 39 which provides a segment 39a of increased diameter compared to the remaining portion 39b of the cam. When the bar 50 is in contact with the portion 39b, the picker bar 52 is in the solid-line position of FIG. 3. However, when the cam 39 rotates so that the bar 50 is in contact with the segment 39a, the bar 50 is depressed, raising the picker bar 52 to the broken-line position of FIG. 3.

The above-described apparatus operates as follows: honey frames are suspended on the horizontal conveyor chains 3 by their lugs 6, as described above. The chains 3 move the frames towards the vertical conveyor chains 4a, 4b, at the inner ends of the chains 3.

The train of driving chains, sprockets and cams described above is timed such that as a pair of gaps 7 in the vertical feed chains 4a, 4b, approach the top of corresponding drive sprockets and start to travel down the inside run of said chains, the picker bar 52 is moved forward to the solid-line position of FIG. 3 (i.e. forward and lowered) by the follower 46 moving in direction C and the bar 50 contacting the reduced-diameter portion 39b of the cam 39, so that the picker bar 52 is lowered. In this position, fingers 55 lie one each side of the lugs 6 of the frame 5 closest to the vertical feed chains 4a, 4b, which rests on the bridge brackets 3b (FIG. 4).

As the cam 38 continues to rotate, the follower 46, the picker bar 52, and the frame 5 captured by the picker bar, all are drawn in the direction of arrow D. Simultaneously, the cam 37 raises the follower 41, the bracket 43 and the stop 44 in the direction of arrow E, until the bracket 43 is dear of the top of the frame 5, so that as the picker bar 52 draws the frame 5 forwards, the frame lugs 6 can pass into the gaps 7 and the frame is suspended from the vertical feed chains 4a, 4b. Brackets (not shown) protect the outer side edges of the chains 4a, 4b, and somewhat increase the gap between the chains 4, over the middle part of their run, to ensure that the frames 5 (which may have wax projecting irregularly from their surfaces) do not foul the chains 4.

As the frame travels downwards towards the C & B held in the vertical feed chains 4a, 4b, the cam 37 moves the follower 41, bracket 43 and stop 44 in the direction F, so that the horizontal surface of bracket 43 presses down on the top of the frame 5 held in the chains 4, to positively locate the lugs 6 in the gaps 7. The chains 4 then draw the frame 5 through the flexible flaps attached to the cutter guards of the C & B, and then down through the rotary cutters of the C & B and the frame 5 is automatically released from the chains 4 when they reach the bottom of their run. The frame is then removed to further processing apparatus, in known manner.

As the bracket 43 is pushing the frame 5 on the chains 4, the stop 44 is in the position of FIG. 3, blocking further horizontal movement of frames on the chains 3. The above-described cycle is repeated until each of the frames 5 on the chains 3 has been lowered into the C & B.

We claim:

1. Apparatus for feeding honey frames one by one into an automatic rotary cutter uncapping machine, said apparatus comprising:

a pair of continuous spaced parallel horizontal conveyors adapted to convey a plurality of honey frames from a first position at which said frames are loaded onto said conveyors to a second position at which said frames are removed one by one from said conveyors, each said frame being supported upon said horizontal conveyors by a lug formed at each upper corner of said frame and projecting outwards therefrom;

a pair of continuous spaced parallel vertical conveyors extending downwardly from adjacent said second position, said vertical conveyors being formed with opposed gaps therein each sized to receive one of said lugs therein;

a movable stop which is arranged to prevent frames on the horizontal conveyors from moving onto the vertical conveyors until said gaps are at a predetermined position, and there is sufficient room for a frame to hang vertically between said conveyors; and a reciprocating picker bar which is arranged to draw the single frame closest to said second position on the horizontal conveyors onto the vertical conveyors, when said gaps reach said predetermined position, such that said frame lugs are received within said chain gaps.

2. The apparatus as claimed in claim 1 further comprising a bridge bracket adjacent each said horizontal conveyor at said second position, each bridge bracket being positioned and adapted to receive thereupon the frame closest to said second position.

3. The apparatus as claimed in claim 1 or claim 2, further comprising a pushing means for pushing downwards a frame whose lugs are held in the gaps in said vertical conveyors, into firm engagement with said conveyors.

4. The apparatus as claimed in claim 1, wherein said gaps are spaced apart vertically by a distance greater than the height of a honey frame.

5. The apparatus as claimed in claim 1, wherein all the moving parts of the apparatus are driven from a single motor.

6. The apparatus as claimed in claim 5, wherein said motor is arranged to drive:

1) a first shaft upon which are mounted two spaced first driving wheels each drivably engaged with one of said horizontal conveyors;

2) two spaced counter-rotating second driving wheels each drivably engaged with one of said vertical conveyors;

3) a third driving wheel which is mounted upon a common axis with three cams.

7. The apparatus as claimed in claim 6, wherein one of said three cams is arranged to reciprocate said stop in a vertical plane; the second of said cams is arranged to reciprocate said picker bar in a horizontal plane; and the third of said cams is arranged to reciprocate said picker bar in a vertical plane.

8. The apparatus as claimed in claim 7, wherein said movable stop is connected to a pushing means for pushing downwards a frame whose lugs are held in the gaps in said vertical conveyors, into firm engagement with said conveyors.

9. The apparatus as claimed in claim 8 wherein said three cams and said driving means are timed such that as a pair of opposed gaps in said vertical conveyors is level with, or just below, said second position, the movable stop is raised and the picker bar is moved towards the horizontal conveyors, downwards, and then in the opposite direction, to draw the frame at said second position into engagement with said gaps.

10. The apparatus as claimed in claim 9 wherein each said conveyor comprises a chain.

11. The apparatus as claimed in claim 10 wherein each said vertical conveyor can comprise an in-feed chain of the uncapping machine extended vertically upwards.

12. The apparatus as claimed in claim 9 wherein said driving means wherein each said driving means comprises a sprocket.

* * * * *